United States Patent [19]

Walker, Jr.

[11] 4,449,236

[45] May 15, 1984

[54] ANTI-SIDE TONE TRANSMITTER

[75] Inventor: Wesley F. Walker, Jr., Ringgold, Ga.

[73] Assignee: Walker Equipment Corporation, Ringgold, Ga.

[21] Appl. No.: 366,501

[22] Filed: Apr. 8, 1982

[51] Int. Cl.³ .................... H04R 1/04; H04R 19/01
[52] U.S. Cl. .................... 381/91; 179/111 E; 179/121 D
[58] Field of Search ........... 179/111 E, 121 R, 121 D, 179/179, 180, 187, 188, 1 DM; 381/91, 92, 122

[56] References Cited

U.S. PATENT DOCUMENTS

| | | | |
|---|---|---|---|
| 664,904 | 1/1901 | Skold . | |
| 1,372,862 | 3/1921 | Carmody . | |
| 2,118,993 | 5/1938 | Volf | 179/122 |
| 2,311,416 | 2/1943 | Salb et al. | 181/24 |
| 3,536,862 | 10/1970 | Weingartner | 179/121 D |
| 3,660,602 | 5/1972 | Thompson | 179/180 X |
| 3,830,988 | 8/1974 | Mol et al. | 179/187 |
| 4,009,355 | 2/1977 | Poradowski | 179/121 D |
| 4,385,209 | 5/1983 | Greason et al. | 179/111 E |

FOREIGN PATENT DOCUMENTS

| | | | |
|---|---|---|---|
| 929623 | 1/1948 | France | 179/179 |
| 52-23957 | 5/1977 | Japan | 179/121 D |
| 1412597 | 11/1975 | United Kingdom | 179/180 |

Primary Examiner—A. D. Pellinen
Assistant Examiner—Keith E. George
Attorney, Agent, or Firm—Seidel, Gonda & Goldhammer

[57] ABSTRACT

Anti-side tone transmitter insertable in a telephone handset improves transmission of the speaker's voice without distortion in high ambient noise environments. The transmitter cap is provided with a central opening in communication with an electret microphone. One or more satellite openings are spaced from and at least partially surround the central opening. An acoustic damping element is located below the satellite openings. The electret microphone is mounted below the cap on a PC board which contains the transmitter circuitry. The PC board is seated on a shelf formed in the interior surface of the side wall of the transmitter cup. Conventional telephone handset cord transmitter wires may be connected to screw terminals on the base of the transmitter cup or to spade lugs mounted on the PC board.

7 Claims, 9 Drawing Figures

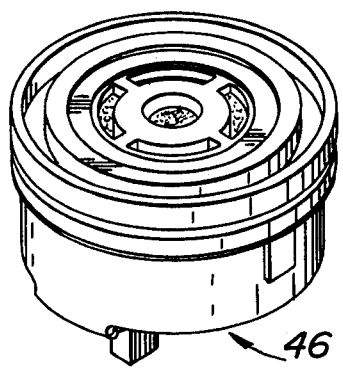
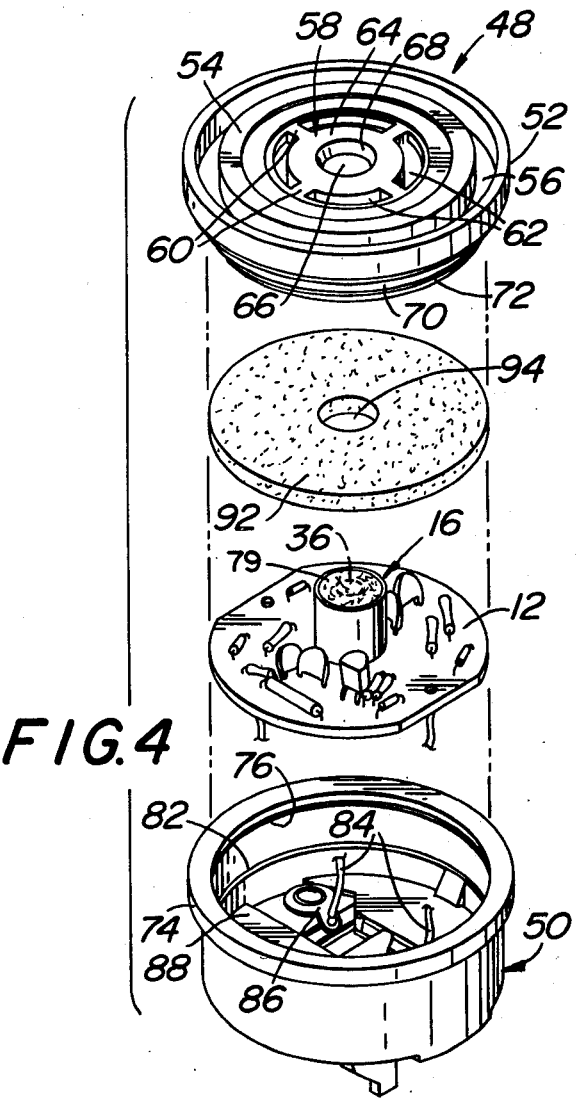
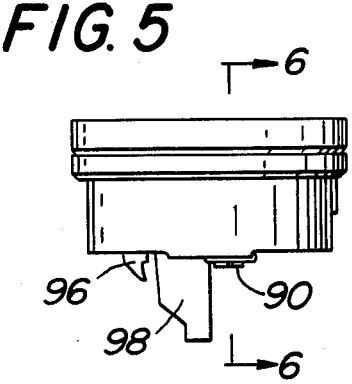
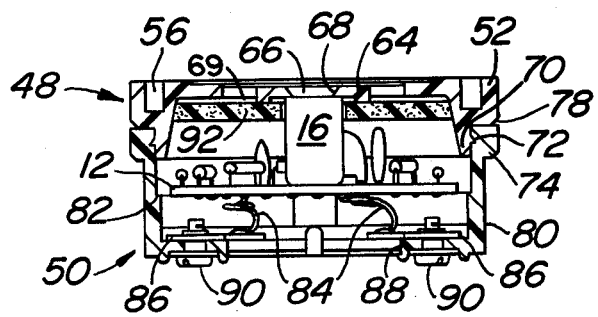

U.S. Patent   May 15, 1984   4,449,236
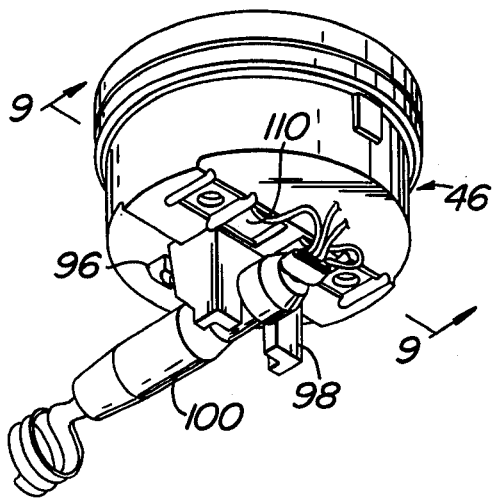
FIG. 7
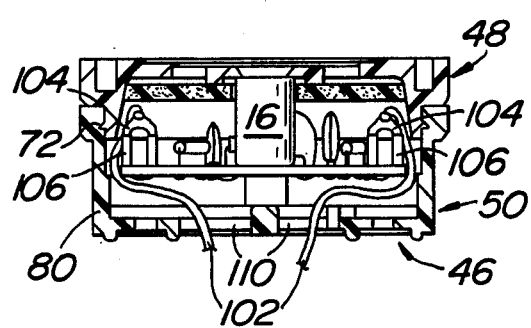
FIG. 9
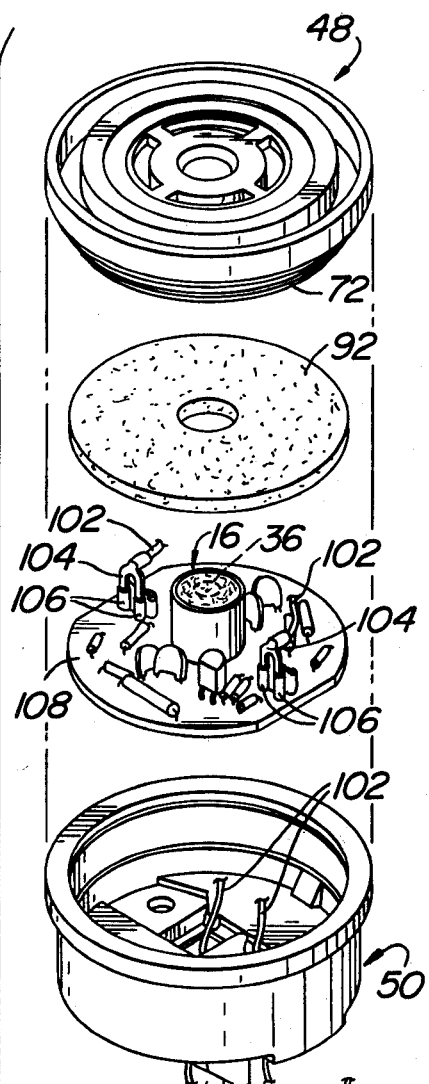
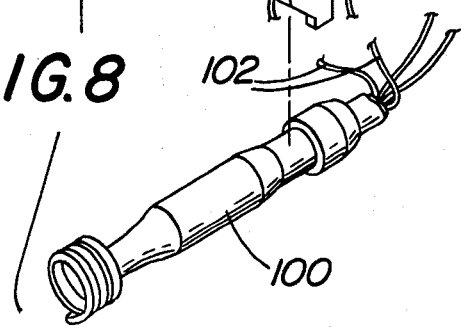
FIG. 8

ANTI-SIDE TONE TRANSMITTER

BACKGROUND OF THE INVENTION

Voice transmitters for telephone communication have long been known. In spite of the great advances in telephone communication over the years, the problem of transmitting a speaker's voice clearly in a high ambient noise environment has remained largely unsolved.

When using telephones equipped with prior art transmitters in high background noise environments, the speaker must often raise his voice to be heard over the background noise. This may cause the transmitter circuitry to saturate, resulting in distortion of the speaker's voice. High background noise also produces excessive side tone at the speaker's receiver. Side tone is commonly understood to mean the portion of the speaker's signal which appears at his own receiver without appreciable delay. Side tone causes the speaker to lower his voice, reducing the voice volume which the listener receives. A certain amount of voice side tone is desirable to prevent the phone from sounding "dead" to the speaker. In high ambient noise enviroments, excessive amounts of noise side tone may be generated so that the speaker is unable to hear his own voice at the receiver. Telephones provided with receiver amplifiers further aggravate this problem by providing amplification of the noise side tone.

The instant invention avoids the drawbacks of prior art transmitted by transmitting pure, clear sound and by eliminating excessive noise side tone.

The speaker's voice can be heard clearly over background noise without the need for shouting and without distortion.

The invention permits clear transmission of the speaker's voice even when it is necessary to speak softly.

Further, the invention is ideally suited for use with acoustic couplers of computer data communications.

SUMMARY OF THE INVENTION

The present invention is directed to an anti-side tone transmitter including a cap and a cup. The cap has a central opening and one or more satellite openings spaced from and at least partially surrounding the central opening. The central opening of the cap is in communication with the acoustic entrance of an electret microphone so that sound is directed through the central opening to the acoustic entrance of the microphone. The microphone is mounted on a PC board seated on a self formed in the interior surface of the side wall of the transmitter cup. The base of the cup may be provided with one or more openings to accomodate the handset cord transmitter wires. Spade lugs may be mounted on the PC board to receive the transmitter wire spade clips.

For the purpose of illustrating the invention, there are shown in the drawings several forms which are presently preferred; it being understood, however, that this invention is not limited to the precise arrangements and instrumentalities shown.

DETAILED DESCRIPTION OF THE DRAWINGS

Figure 1:
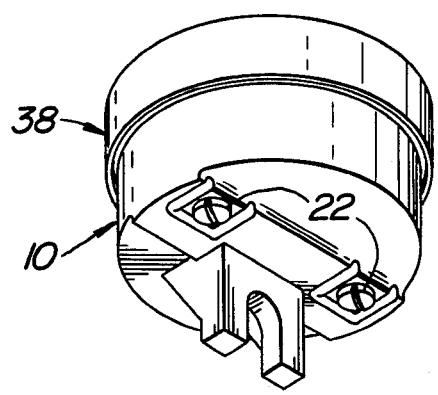
Figure 2:
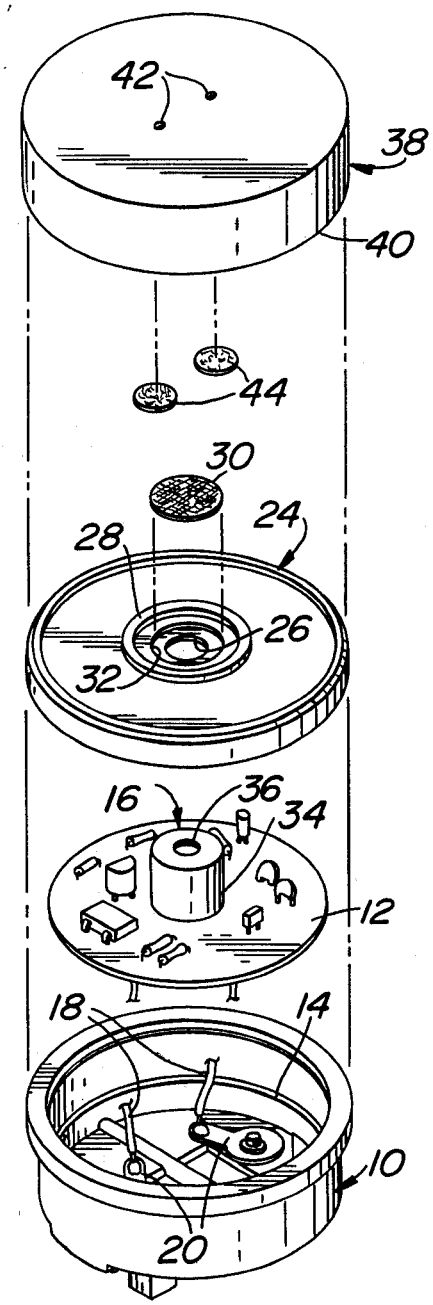

FIG. 1 is a perspective view of a prior art transmitter.
FIG. 2 is an exploded view of the prior art transmitter shown in FIG. 1.
FIG. 3 is a perspective view of a transmitter in accordance with the present invention.
FIG. 4 is an exploded view of the transmitter shown in FIG. 3.
FIG. 5 is a side elevation of the transmitter shown in FIG. 3.
FIG. 6 is a sectional view taken the lines 6—6 in FIG. 5.
FIG. 7 is a perspective view of a transmitter in accordance with the present invention showing the handset cord.
FIG. 8 is an exploded view of the transmitter shown in FIG. 7.
FIG. 9 is a sectional view taken along the lines 9—9 in FIG. 7.

THE PRIOR ART TRANSMITTER

Telephone handset transmitters using electret microphones are not new per se. For example, there is shown in FIGS. 1 and 2 a transmitter using an electret microphone which is known in the art. As shown in FIGS. 1 and 2, the prior art transmitter comprises a cup 10. A printed circuit ("PC") board 12 is seated on a shelf 14 formed on the interior surface of the side wall of the cup. The PC board supports an electret microphone 16 and associated transmitter circuitry. Flexible leads 18 connect the circuitry on the PC board to solder lugs 20 located on the cup base. The lugs 20 are electrically connected to screw terminals 22 on the underside of the cup. The screw terminals 22 accept the transmitter wires of a standard handset cord.

The prior art transmitter includes a disc 24 which is provided with a central opening 26. Opening 26 is surrounded by an annular wall 28. A cloth disc 30 trapped in a well 32 formed in disc 24 covers the central opening 26.

The electret microphone 16 comprises a casing 34 provided with a central opening 36 which serves as the acoustic entrance for the microphone. The sound of the speaker's voice passes through the opening 36 to the electret microphone sound transducer element (not shown) located within the casing 34. A well is formed in the underside of disc 24 to center the disc atop microphone 16 when the transmitter is assembled. The casing opening 36 and the disc opening 26 are aligned concentrically when disc 24 is centered on the microphone 16.

The prior art transmitter also includes a metal cap 38. The bottom edge 40 of cap 38 is rolled to permanently secure cap 38 to cup 10.

The transmitter cap 38 is provided with two spaced apart openings 42. The openings 42 lie along a diameter of cap 38 and are symmetrically spaced from the geometric center of the cap. Two small foam discs 44 are mounted on the underside of cap 38 below openings 42. The separation between cap openings 42 is greater than the diameters of disc opening 26 and cloth disc 30 but is less than the diameter of disc wall 28. Accordingly, sound passing through cap openings 42 travels through cloth discs 44 and 30, through disc opening 26 to the microphone opening 36.

The prior art transmitter shown in FIGS. 1 and 2 does not eliminate objectionable side tone and is not suitable for use in high ambient noise environment.

DETAILED DESCRIPTION OF THE INVENTION

Referring now to FIGS. 3-9, wherein like numerals indicate like elements, there is shown a transmitter 46 in accordance with the present invention. As best shown in FIGS. 4 and 6, the transmitter comprises a cap 48 and a cup 50, both preferably formed of a plastic polymeric material. An upstanding annular wall 52 defines the cap periphery. The cap includes a central portion 54 spaced inwardly of the annular wall 52. The annular wall 52 and the central portion 54 define an annular channel 56.

The annular channel 56 is formed in cap 48 to facilitate manufacture of the cap, specifically, to avoid sinking of material along the top periphery of the cap during formation of the cap. The channel 56 may be omitted without detracting from the acoustic performance of the transmitter 46. Thus, the central portion 54 may extend to the peripheral wall 52.

The cap 48 includes a spider 58 having one or more radiating arms 60 separated by one or more arcuate shaped satellite openings 62 which at least partially surround opening 66. The arcuate openings 62 are spaced from opening 66 so as not to be in communication with the microphone opening 36. In the preferred embodiment described herein, four arcuate slots 60 of equal length are preferred. Other numbers and shapes of satellite openings 62 may, however, be employed without departing from the spirit or scope of the invention.

The spider arms 60 connect a hub 64 to the cap central portion 54. The hub 64 is provided with a centrally located opening 66. Preferably, the hub interior wall 68 which circumscribes opening 66 is provided with a bevel.

The cap 48 is provided with a depending annular wall 69 at the periphery of hub 64. The wall 69 serves to center cap 48 on the electret microphone 16. The wall also serves as an acoustic baffle between opening 36 and satellite openings 62.

Cap 48 is also provided with a depending annular wall 70 spaced inwardly of the peripheral upstanding wall 52. The exterior surface of the annular wall 70 is provided with a bead 72. The bead 72 enables the transmitter cap 48 to be snap fastened to transmitter cup 50 as described more fully below.

Transmitter cup 50 is provided with an upstanding annular flange 74. The interior surface of the flange 74 is provided with an annular groove 76 which is sized to receive the cap bead 72. The cap 48 and cup 50 are made of a material which maintains shape but yields sufficiently to enable the cap and cup to be securely fastened together by pressing the bead 72 along the interior wall of flange 74 until the bead lodges in groove 76.

The transmitter cap wall 52 is provided with an annular bevel 78 as best shown in FIG. 6. The cap 48 may be easily removed from cup 50 by prying the cap away from the cup at bevel 78 to dislodge bead 72 from groove 76.

An electret microphone 16 and associated transmitter circuitry are mounted on the PC board 12. A small foam disc 79 is mounted atop the microphone casing to damp sound passed through cap opening 66 to microphone opening 36. The microphone 16 and transmitter circuitry are not described in further detail since they are well-known elements.

The transmitter cup 50 is provided with an annular side wall 80. The interior surface of the side wall 80 is provided with a shelf 82 which supports the PC board 12. Shelf 82 is located at an elevation along the interior surface of side wall 80 such that the top of microphone 16 is substantially flush with the underside of hub 64 when PC board 12 is seated on the shelf. See FIG. 6.

Flexible wires 84 connect the PC board transmitter circuitry to solder lugs 86 located on the base 88 of cup 50. The solder lugs 86 are in electrical contact with screw terminals 90, described more fully below.

A foam insert 92 is provided at the underside of cap 48, circumscribed by depending wall 70. The foam insert 92 is substantially disc shaped and has an opening 94 at its center to accomodate microphone 16. The microphone 16 protrudes within opening 94 so that opening 36, the acoustic entrance of the microphone, is exposed to the central opening 66 in cap 48. The foam insert serves as an acoustic damper.

The screw terminals 90, as well as depending projections 96 and 98, are located on the underside of the cup base. See FIG. 5. Projections 96, 98 position and hold the standard flexible sleeve 100 of the handset cord. See for example FIG. 7. Screw terminals 90 provide electrical connection points between the transmitter wires of the handset cord and the solder lugs 86. The structural connection between the screw terminals and solder lugs is well-known and requires no further description.

A further embodiment of the invention, which is particularly suited for rapid replacement of a standard transmitter, for example a pancake shaped transmitter of the carbon granule-type, is shown in FIGS. 7-9.

The standard handset cord shown in FIGS. 7 and 8 is provided with a flexible sleeve 100 through which the transmitter wires 102 pass. Wires 102 are provided with spade clips 104 at their ends. See FIG. 8. Spade lugs 106 for receiving the mating spade clips 104 are mounted on the PC board 12. The spade lugs 106 are electrically connected to appropriate parts of the PC board transmitter circuitry.

Flats 108 are formed along the periphery of the PC board to provide clearance for the transmitter wires 102. See FIG. 8. The wires 102 pass through rectangular openings 110 formed in the base 88 of cup 50 (FIG. 7).

The transmitter 46 can be easily installed in an existing telephone handset. The user merely disconnects the transmitter wires 102 from the conventional transmitter, such as the carbon granule transmitter, and removes the transmitter from the handset. The transmitter wires 102 are then threaded through the base openings 110 provided in cup 50. The wires are threaded through the clearances between the PC board flats 108 and the interior surface of side wall 80. The transmitter wire spade clips 104 are then inserted in the PC board spade lugs 106. The cap 48 is then snap fastened to cup 50 as previously described. The transmitter 46, so assembled, is then placed in the handset and secured in position by screw fastening the handset transmitter cover (not shown) in place over the transmitter.

The present invention may be embodied in other specific forms without departing from the spirit or essential attributes thereof. Accordingly, reference should be made to the appended claims, rather than to the foregoing specification, as indicating the scope of the invention.

I claim:
1. Anti-side tone transmitter insertable in a telephone handset having a cover, comprising:
 a cup having a sidewall;
 a cap secured to the cup so as to form an assembly insertable in the telephone handset;
 a sound transducer element disposed below said cap within the interior of said assembly;

said transducer element having a casing provided with a single acoustic entrance disposed in a plane substantially flush with the underside of said cap;

said cap having a central opening aligned with and in acoustic communication with said acoustic entrance of said transducer element;

said cap having one or more annular openings spaced from said central opening and disposed inwardly of said cup sidewall and relative to said transducer element casing so that said one or more cap openings are not in acoustic communication with said acoustic entrance of said transducer element.

2. Anti-side tone transmitter according to claim 1 wherein said cap and said cup are provided with first and second mating elements respectively for removably fastening said cap to said cup.

3. Anti-side tone transmitter according to claim 1 including a printed circuit board disposed below said cap, said transducer element being mounted on said printed circuit board, said cup being provided with means for supporting said printed circuit board.

4. Anti-side tone transmitter according to claim 3 including a transmitter circuit mounted on said printed circuit board, said transducer element being electrically connected to said transmitter circuit, and means mounted on said printed circuit board for connecting the transmitter wires of a handset cord to said transmitter circuit.

5. Anti-side tone transmitter according to claim 1 wherein said transducer element is an electret microphone transducer element.

6. Anti-side tone transmitter according to claim 1 including acoustic damping means disposed with said assembly between said one or more cap openings and said transducer element casings.

7. Anti-side tone transmitter according to claim 1 wherein said cap is provided with a depending wall spaced inwardly of said one or more openings so as to at least partially surround said transducer element casing.

* * * * *